United States Patent
Numata

(10) Patent No.: US 8,888,602 B2
(45) Date of Patent: Nov. 18, 2014

(54) ELECTRIC TOOLS

(71) Applicant: Fumitoshi Numata, Anjo (JP)

(72) Inventor: Fumitoshi Numata, Anjo (JP)

(73) Assignee: Makita Corporation, Anjo-shi (JP)

( * ) Notice: Subject to any disclaimer, the term of this patent is extended or adjusted under 35 U.S.C. 154(b) by 0 days.

(21) Appl. No.: 13/682,149

(22) Filed: Nov. 20, 2012

(65) Prior Publication Data

US 2013/0143676 A1   Jun. 6, 2013

(30) Foreign Application Priority Data

Dec. 1, 2011   (JP) .................................. 2011-263307

(51) Int. Cl.
*F16D 3/64* (2006.01)
*B25F 5/00* (2006.01)

(52) U.S. Cl.
CPC .. *F16D 3/64* (2013.01); *B25F 5/006* (2013.01)
USPC ........................................... 464/77; 464/160

(58) Field of Classification Search
USPC ........................ 464/77, 78, 81, 160; 173/217
See application file for complete search history.

(56) References Cited

U.S. PATENT DOCUMENTS

| | | | | |
|---|---|---|---|---|
| 2,263,113 A | * | 11/1941 | Wichorek et al. | 464/77 |
| 2,334,877 A | * | 11/1943 | Johnson | 464/77 |
| 2,360,157 A | * | 10/1944 | Olson | 464/77 X |
| 2,425,539 A | * | 8/1947 | Johnson | 464/77 |
| 2,484,321 A | * | 10/1949 | Stubau | 464/77 |
| 3,283,538 A | * | 11/1966 | Trefny | 464/77 |
| 5,873,786 A | * | 2/1999 | Hosoya et al. | |

FOREIGN PATENT DOCUMENTS

| | | | |
|---|---|---|---|
| JP | 2002264031 | * | 9/2002 |
| JP | A 2002-264031 | | 9/2002 |
| JP | A 2010-179436 | | 8/2010 |

OTHER PUBLICATIONS

"Advantages of Electric Motors." El Paso Electric. Sep. 20, 2007, [online], [retrieved on Dec. 18, 2013] Retrieved from the Internet <URL: http://web.archive.org/web/20070920055946/http://elpaso.apogee.net/md/mfgeadv.asp>.*

* cited by examiner

*Primary Examiner* — Gregory Binda
*Assistant Examiner* — Josh Skroupa
(74) *Attorney, Agent, or Firm* — Oliff PLC

(57) ABSTRACT

An electric tool may include an electric motor, a spindle to which a working tool may be attached, and a torque transmission path provided between the electric motor and the spindle and including a first rotary member and a second rotary member. A torque transmission device may be provided between the first rotary member and the second rotary member and may include a plurality of resiliently deformable torque transmission members.

12 Claims, 3 Drawing Sheets

ELECTRIC TOOLS

This application claims priority to Japanese patent application serial number 2011-263307, the contents of which are incorporated herein by reference.

BACKGROUND OF THE INVENTION

1. Field of the Invention

Embodiments of the present invention relate to electric tools having electric motors as drive sources, and in particular to rotary electric tools, such as disk grinders and screwdrivers.

2. Description of the Related Art

In an electric tool having an electric motor as a drive source, the rotational power of the electric motor may be output to an end tool or a working tool, such as a grinding wheel or a driver bit, via a reduction gear train. In this kind of electric tool, when the electric motor starts, for example through the operation of a switch, it may be possible to generate an impact called a "start shock" that is applied to a torque transmission system or the working tool.

In order to solve the problem of this start shock generation, JP-A-2002-264031 and JP-A-2010-179436 have proposed start shock attenuation structures. According to these attenuation structures, a C-shaped torque transmission member resiliently deformable in a radial direction may be interposed between two rotary elements in a torque transmission system. Therefore, when the rotational torque is transmitted from one to the other of the two rotary elements, the torque transmission member may resiliently deform in a radial direction (i.e., a diameter enlarging direction) according to a load applied to the rotary element on the driven side. In this way, the start shock can be attenuated. As a result, it is possible to improve the durability and the feeling in use of the electric tool.

However, in the case of the above known attenuation structures, if they are applied to a large-size electric tool having a large electric motor output, it may be possible that the C-shaped torque transmission member can be instantaneously opened to be enlarged, leading to an insufficient shock attenuation effect. In light of this, it may lead to an increase in the thickness of the torque transmission member. However, in this case, a possibility of metallic fatigue of the torque transmission member due to repeated application of the load may lead to increased damages, such as cracking and breakage. As the size of the electric tool increases, the possibility of causing damages may be increased. Damages to the torque transmission member may reduce the durability of the electric tool.

Therefore, there has been a need in the art for a technique of attenuating a start shock without leading to damages to a torque transmission member.

SUMMARY OF THE INVENTION

In one aspect according to the present teachings, an electric tool may include an electric motor, a spindle to which a working tool may be attached, and a torque transmission path provided between the electric motor and the spindle and including a first rotary member and a second rotary member. A torque transmission device may be provided between the first rotary member and the second rotary member and may include a plurality of resiliently deformable torque transmission members.

DETAILED DESCRIPTION OF THE INVENTION

Figure 1:
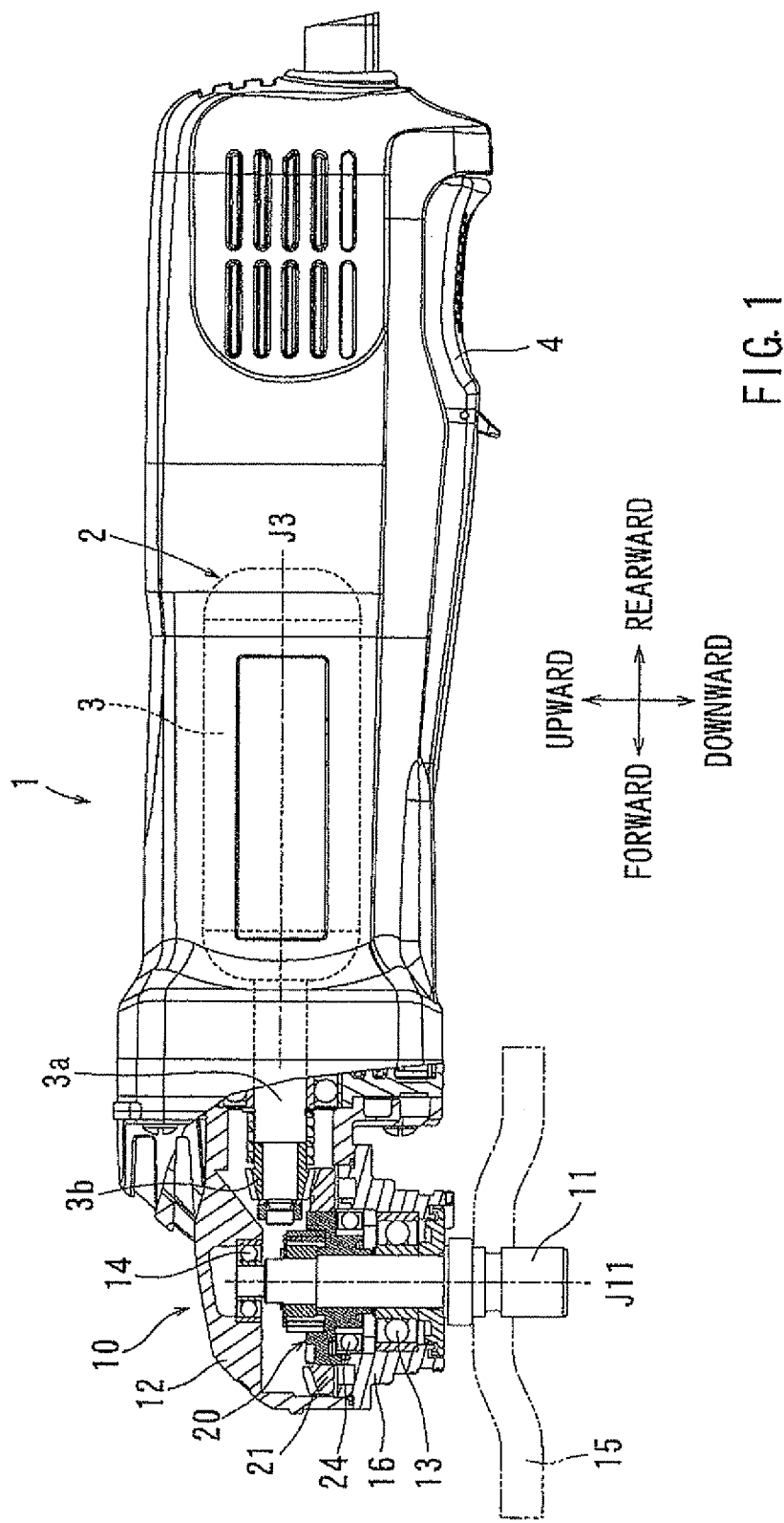
FIG. 1 is a side view of an electric tool configured as a disk grinder according to a representative embodiment, with a part shown in a vertical sectional view for showing the internal structure of a gear head portion.

Each of the additional features and teachings disclosed above and below may be utilized separately or in conjunction with other features and teachings to provide improved electric tools. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, an electric tool may include an electric motor, a spindle to which a working tool may be attached, a torque transmission path provided between the electric motor and the spindle and including a first rotary member and a second rotary member, and a torque transmission device provided between the first rotary member and the second rotary member. The torque transmission device may include a plurality of C-shaped torque transmission members overlapping each other in a radial direction. Each of the torque transmission members may include a first end and a second end with respect to a circumferential direction. Further, they may be configured to be resiliently deformed in the radial direction for transmission of torque through engagement of the first end and the second end with the first rotary member and the second rotary member, respectively.

Therefore, when the electric motor is started, the torque transmission members may each resiliently deform in the radial direction, such as in a diameter enlarging direction, so that the start shock can be sufficiently absorbed.

In particular, because the start shock may be dispersed to the torque transmission members, it is possible to prevent potential fatigue breakdown of the torque transmission members. In this way, they can absorb a larger start shock in comparison with a single torque transmission member.

The torque transmission members may be consecutively engaged and positioned with respect to the first and second rotary members starting with one positioned on a radially inner side. With this arrangement, each of the torque transmission members can resiliently deform with a time lag from that positioned on the radially inner side. Hence, the resilient force applied by the torque transmission members can be incrementally increased to enable smooth absorption of the start shock. In this way, it is possible to more assuredly absorb a large start shock that may be produced when a large rotational torque is transmitted.

A representative embodiment will now be described with reference to FIGS. 1 to 4. Referring to FIG. 1, there is shown an electric tool 1 such as a disk grinder. The electric tool 1 may generally include a body section 2 and a gear head section 10. The body section 2 may serve as a grip portion that can be grasped by the user. The gear head section 10 may be disposed on the front side of the body section 2. An electric motor 3 serving as a drive source may be disposed within the body section 2. A switch lever 4 may be attached to the bottom surface of the body section 2. The user may push the switch lever 4 upward by using fingers of his or her hand that grasps the body section 2. In this way, the electric motor 3 may be started by the operation of the switch lever 4. When the user releases the switch lever 4, the electric motor 4 may be stopped.

An output shaft 3a of the electric motor 3 may protrude forward from the body section 2 into a gear head housing 12 of the gear head section 10. A drive gear 3b may be attached to the front end of the output shaft 3a.

The gear head section 10 may serve to reduce the rotation of the output shaft 3a of the electric motor 3. It may also serve to change the orientation of the rotational output from a rotational axis J3 (i.e., the axis of the output shaft 3a) of the electric motor 3 to a rotational axis J11 of a spindle 11. The rotational axis J11 may lie perpendicular to the rotational axis 33.

The spindle 11 may be supported within the gear head housing 12 via a lower bearing 13 and an upper bearing 14 so as to be rotatable about the rotational axis J11. The lower portion of the spindle 11 may protrude downward from a gear head base 16 mounted to the bottom of the gear head housing 12. A circular grinding wheel 15 may be mounted to the lower portion of the spindle 11.

A torque transmission device 20 may be disposed within the gear head section 10 and may serve to transmit the rotational torque of the electric motor 3 to the spindle 11. The torque transmission device 20 will be hereinafter described with reference to FIGS. 2 to 4.

Figure 3:
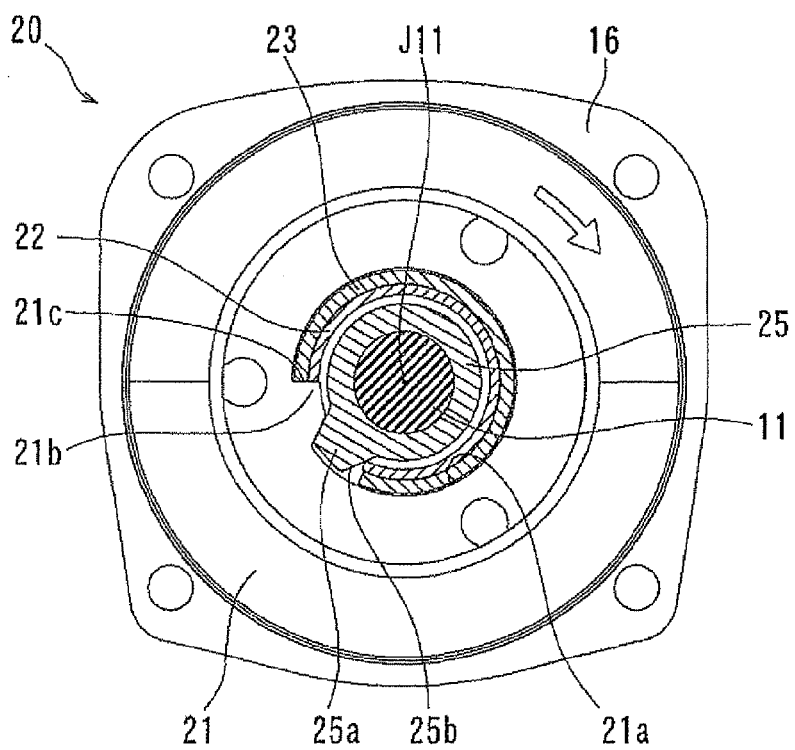
FIG. 3 is a sectional view taken along line (III)-(III) in FIG. 2 showing the torque transmission device in a plan view.
Figure 4:
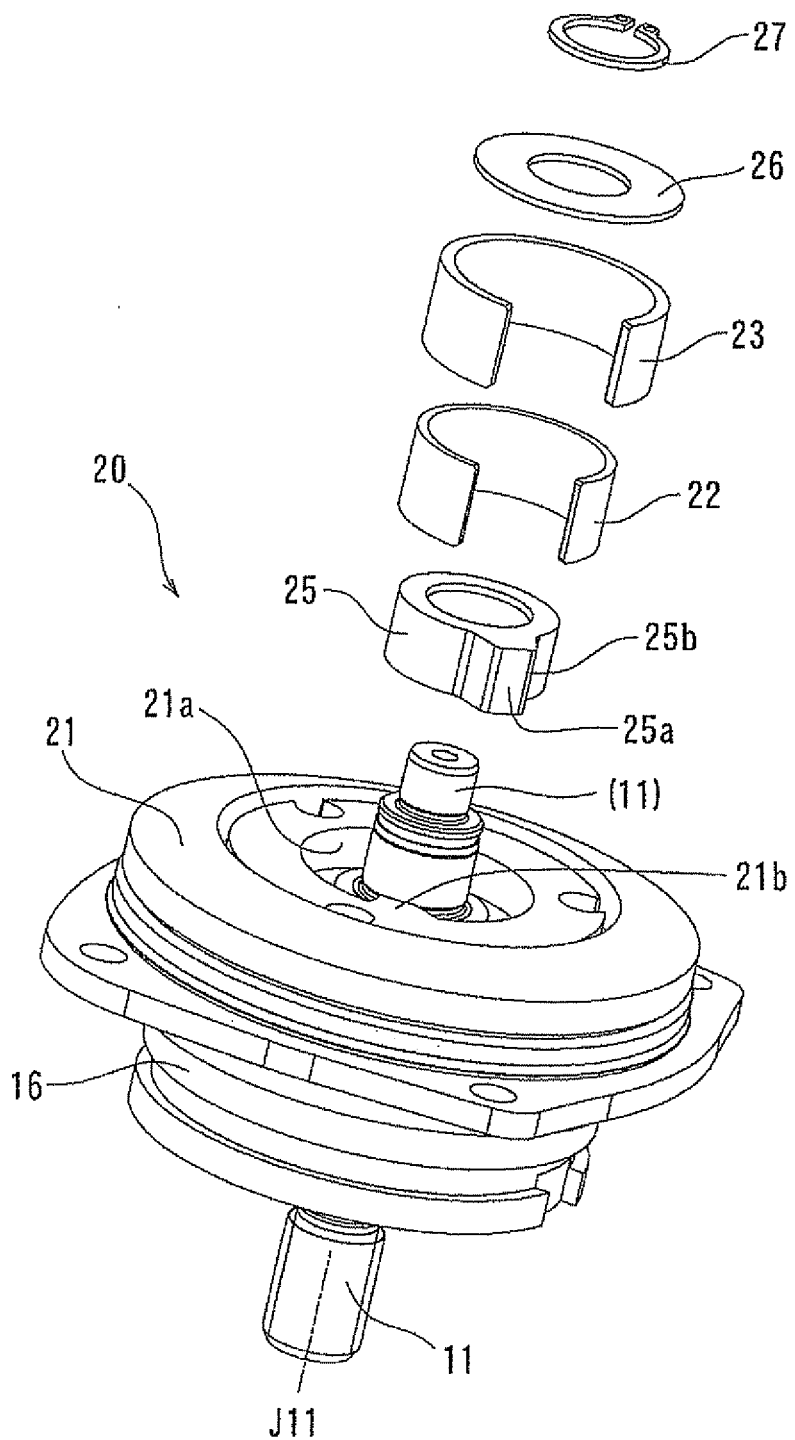
FIG. 4 is an exploded perspective view of the torque transmission device.

The torque transmission device 20 may include a driven gear 21, a first torque transmission member 22 and a second torque transmission member 23. The driven gear 21 may engage the drive gear 3b of the electric motor 3. The first and second torque transmission members 22 and 23 may be interposed between the driven gear 21 and the spindle 11. The driven gear 21 may be rotatably supported by the gear head base 16 via a bearing 24. The driven gear 21 may have a central axial hole through which the spindle 11 extends. In this way, the driven gear 21 is not directly connected to the spindle 11 with respect to the rotation. The rotational torque applied to the driven gear 21 may be transmitted to the spindle 11 via the first and second torque transmission members 22 and 23 and a joint sleeve 25. In FIG. 3, an outline arrow indicates the rotational direction of the driven gear 21.

A substantially circular receiving recess 21a may be formed in the upper surface of the driven gear 21 and may receive therein the first and second torque transmission members 22 and 23 and the joint sleeve 25. As shown in FIG. 3, the driven gear 21 may have a drive-side engaging portion 21b projecting into the receiving recess 21a in a direction radially inward. The front side surface with respect to the rotational direction (upper surface as viewed in FIG. 3) of the drive-side engaging portion 21b may extend along a radial direction with respect to the rotational axis J11 of the spindle 11. The front side surface of the drive-side engaging portion 21b may be configured as a drive-side engaging surface 21c, to which one end in the circumferential direction (i.e., the counterclockwise end) of each of the first and second torque transmission members 22 and 23 may abut. Such a configuration as will be explained later.

The spindle 11 may be press-fitted into an axial hole formed in the joint sleeve 25. Therefore, the joint sleeve 25 rotates together with the spindle 11 about the rotational axis J11. A driven-side engaging portion 25a may be formed on the outer circumferential surface of the joint sleeve 25 and may extend radially outward therefrom. The front and rear side surfaces with respect to the rotational direction of the driven-side engaging portion 25a may be inclined relative to the radial direction with respect to the rotational axis J11 of the spindle 1 such that they converge in a direction radially outward. The rear side surface of the driven-side engaging portion 25a may be configured as a driven-side engaging surface 25b, to which the other end in the circumferential direction (i.e., the clockwise end) of each of the first and second torque transmission members 22 and 23 may abut.

The first and second torque transmission members 22 and 23 may be received within the receiving recess 21a to extend along the outer circumferential side of the joint sleeve 25. Each of the first and second torque transmission members 22 and 23 may be formed of a plate material, such as a metal plate, having a constant width. They may be bent into a C-shape to allow for resiliency in a diameter enlarging direction. The first and second torque transmission members 22 and 23 may be received within the receiving recess 21a so as to overlap each other in the radial direction (i.e., coaxial with each other). In this embodiment, the first torque transmission member 22 may be positioned on a radially inner side and preferably has a thickness of about 1.5 mm. The second torque transmission member 23 may be positioned on a radially outer side and preferably has a thickness of about 2.0 mm. As shown in FIG. 3, the circumferential ends of the first and second torque transmission members 22 and 23 may be substantially aligned with each other in the radial direction.

When the electric motor 3 is stopped (i.e., when no torque is transmitted), the counterclockwise ends of both of the first and second torque transmission members 22 and 23 may abut the drive-side engaging surface 21c of the drive-side engaging portion 21b. On the other hand, the clockwise end of the first torque transmission member 22 may abut the driven-side engaging surface 25b, while the clockwise end of the second torque transmission member 23 may be spaced apart from the driven-side engaging surface 25b. It is preferred that they are spaced apart by a short distance, if any.

Because the circumferential lengths of the first and second torque transmission members 22 and 23 are determined in this way, the first torque transmission member 22 positioned on the radially inner side may first resiliently deform to enlarge its diameter when the electric motor 3 is started. After a short time lag, the clockwise end of the second torque transmission member 23 may abut the driven-side engaging surface 25b, so that the second torque transmission member 23 may resiliently deform to enlarge its diameter. In this way, it is possible to assuredly absorb a relatively large start shock or impact, which may be generated primarily when the gears start to engage for transmission of torque. When the rotational angle of the driven gear 21 reaches a maximum relative to the spindle 11, the resilient deformation in the diameter enlarging direction of the first and second torque transmission members 22 and 23 may also reach a maximum. Resultantly, the first and second torque transmission members 22 and 23 may be pressed against the inner circumferential wall of the receiving recess 21a. The driven gear 21 may be directly connected to the spindle 11 with respect to rotation (rigid connection). In this way, substantially the entire output torque of the electric motor 3 may be transmitted to the spindle 11.

Figure 2:
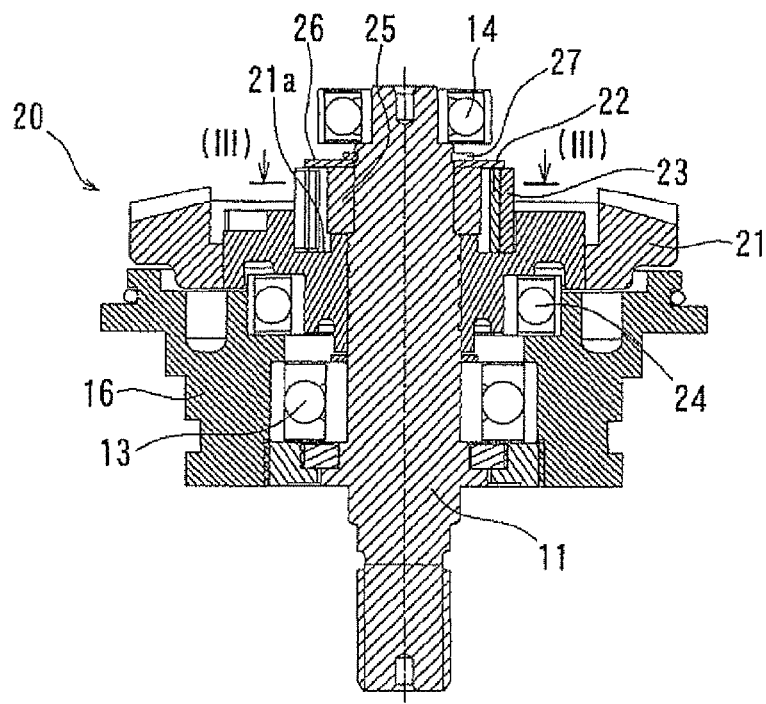
FIG. 2 is a vertical sectional view of a torque transmission device of the electric tool.

As shown in FIG. 2, a washer 26 may prevent the first and second torque transmission members 22 and 23 from being removed from within the receiving recess 21a. The washer 26 may be fixed in position by a stop ring 27 attached to the spindle 11.

As described above, as the electric motor 3 starts to rotate the driven gear 21 in the direction indicated by an outline arrow in FIG. 3 (clockwise direction), the counterclockwise ends of the first and second torque transmission members 22 and 23 may abut to or engage the drive-side engaging surface 21c. Then, the clockwise ends of the first and second torque transmission members 22 and 23 may in turn abut or engage the driven-side engaging surface 25b, so that the first and second torque transmission members 22 and 23 may be shifted in the diameter-enlarging direction against their resiliency. As the first and second torque transmission members 22 and 23 are shifted in the diameter-enlarging direction with their clockwise ends abutting the driven-side engaging surface 25b, the rotational torque of the driven gear 21 may be incrementally transmitted to the joint sleeve 25 and further to the spindle 11. In this way, potential impact (start shock) generated by the driven gear 21 when starting the electric motor 3 may be absorbed or attenuated.

In this way, the first and second torque transmission members 22 and 23 may function as an impact attenuation device, for absorbing potential start shock generated when starting the motor 3, as well as a torque transmission device, for transmitting the output torque of the electric motor 3 to the spindle 11.

In particular, in this embodiment, the rotational torque of the electric motor 3 may be transmitted along a transmission path: [output shaft 3a of electric motor 3→driven gear 21→first and second torque transmission members 22 and 23→joint sleeve 25→spindle 11]. In this way, the torque transmission device 20 comprised mainly of the two C-shaped torque transmission members 22 and 23 can be provided in the torque transmission path. The transmission path generally lies between the output shaft 3a of the electric motor 3 and the spindle 11. In addition, potential start shock generated when starting the electric motor 3 may be absorbed by the resilient deformation of the torque transmission members 22 and 23.

As described above, according to the electric tool 1 of this embodiment, the first and second torque transmission members 22 and 23 may be provided between the driven gear 21 and the spindle 11. Therefore, it is possible to provide higher impact absorption ability in comparison to the known arrangement having only one torque transmission member. In this way, it is possible to assuredly absorb a potential start shock that may be generated in a large size electric tool having a high output electric motor as a drive source.

Attenuation of the start shock may reduce unpleasant sounds and vibrations when starting the electric motor 3. Additionally, it is possible to prevent potential breakage of the driven gear 21. Therefore, the durability of the torque transmission device 20 and eventually that of the electric tool 1 can be improved.

In addition, the torque transmission device 20 of this embodiment does not incorporate a single torque transmission member having a large thickness. Instead, two separate torque transmission members 22, 23 are provided for individually absorbing impact in such a manner that the impact is dispersed to the multiple torque transmission members. In addition, each of the torque transmission members 22 and 23 may have a thickness that is similar to and preferably not larger than that of the known torque transmission member. In this way, it is possible to avoid potential damage due to fatigue breakage and achieve high impact adsorption ability.

Further, the driven-side engaging surface 25b, to which the clockwise end portions of the torque transmission members 22 and 23 abut, is inclined relative to the radial direction. Therefore, the clockwise-end portions can smoothly move in the direction radially outward along the driven-side engaging surface 25b to cause enlargement of the torque transmission members 22 and 23. Therefore, the impact adsorption ability of the torque transmission members 22 and 23 can be assuredly used.

The above embodiment can be modified in various ways. For example, although two torque transmission members 22 and 23 with different thicknesses have been used in the torque transmission device 20, it may be possible that the torque transmission members 22 and 23 have the same thickness.

In addition, the torque transmission device 20 may include three or more torque transmission members.

Further, although the torque transmission members 22 and 23 start to be resiliently deformed consecutively starting from those positioned on the radially inner side, they may start to be deformed at the same time. For example, the length of the second torque transmission member 23 may be lengthened such that both of the clockwise ends of the first and second torque transmission member 22 and 23 can abut the driven-side engaging surface 25b in the initial state shown in FIG. 3.

Furthermore, although the driven-side engaging surface 25b of the joint sleeve 25 is inclined relative to the radial direction, it may extend along the radial direction.

Furthermore, although the electric tool 1 of the above embodiment is configured as a disk grinder, the above teachings can also be applied to any other electric tools. Some examples include electric drilling tools, electric screwdrivers and electric impact tools including hammers.

What is claimed is:

1. An electric tool comprising:
an electric motor;
a spindle to which a working tool may be attached;
a torque transmission path provided between the electric motor and the spindle and including a first rotary member and a second rotary member; and
a torque transmission device provided between the first rotary member and the second rotary member; wherein:
the torque transmission device includes a plurality of C-shaped torque transmission members arranged so as to be overlapped with each other in a radial direction;
each of the torque transmission members includes a first end and a second end with respect to a circumferential direction and is configured to be resiliently deformed in the radial direction for transmission of torque through engagement of the first end and the second end with the first rotary member and the second rotary member, respectively;
the torque transmission members include a radially outermost torque transmission member disposed at an outermost position with respect to the radial direction; and
during transmission of torque between the first rotary member and the second rotary member, a radially outer circumferential surface of the radially outermost torque transmission member is pressed against the first rotary member in the radial direction, so that the torque is transmitted from the first rotary member to the radially outermost torque transmission member also via the radially outer circumferential surface of the radially outermost torque transmission member.

2. The electric tool according to claim 1, wherein the torque transmission members are consecutively engaged with the first and second rotary members starting from one positioned nearest to a radially inner side of the first and second rotary members.

3. The electric tool according to claim 1, wherein:
the first rotary member is coupled to the electric motor, so that the first rotary member rotates as the electric motor starts;
the second rotary member is coupled to the spindle and disposed coaxially with the first rotary member;
the first rotary member has a first engaging portion having a first engaging surface;
the second rotary member has a second engaging portion having a second engaging surface; and
the first end and the second end of each of the torque transmission members are respectively opposed to the first engaging surface and the second engaging surface in the circumferential direction, so that rotation of the first rotary member is transmitted to the second rotary member through abutment of the first end and the second end of each of the torque transmission members to the first engaging surface and the second engaging surface, respectively.

4. The electric tool according to claim 3, wherein the torque transmission members include a first torque transmission member having the first end and the second end substantially contacting with the first engaging surface and the second engaging surface in the circumferential direction, respectively, in an initial state before the electric motor is started.

5. The electric tool according to claim 4, wherein the torque transmission members include a second torque transmission member, at least one of the first end and the second end of the second torque transmission member is spaced apart from the first engaging surface or the second engaging surface in the circumferential direction in the initial state.

6. The electric tool according to claim 3, wherein the first engaging surface extends substantially along the radial direction.

7. The electric tool according to claim 3, wherein the second engaging surface extends along a direction inclined by an angle relative to the radial direction.

8. The electric tool according to claim 1, wherein the torque transmission members are different in thickness with respect to the radial direction.

9. The electric tool according to claim 1, wherein the torque transmission members are different in length with respect to the circumferential direction.

10. An electric tool comprising:
an electric motor;
a spindle to which a working tool may be attached;
a torque transmission path provided between the electric motor and the spindle and including a first rotary member and a second rotary member; and
a torque transmission device provided between the first rotary member and the second rotary member; wherein:
the torque transmission device includes a resiliently deformable torque transmission member;
the torque transmission member includes a first end and a second end with respect to a circumferential direction and is configured to be resiliently deformed in the radial direction for transmission of torque through engagement of the first end and the second end with the first rotary member and the second rotary member, respectively; and
during transmission of torque between the first rotary member and the second rotary member, a radially outer circumferential surface of the torque transmission member is pressed against the first rotary member in the radial direction, so that the torque is transmitted from the first rotary member to the torque transmission member also via the radially outer circumferential surface of the torque transmission member.

11. An electric tool comprising:
an electric motor;
a spindle to which a working tool may be attached;
a torque transmission path provided between the electric motor and the spindle and including a first rotary member and a second rotary member; and
a torque transmission device provided between the first rotary member and the second rotary member; wherein:
the torque transmission device includes a plurality of C-shaped resiliently deformable torque transmission members arranged so as to be overlapped with each other in a radial direction;
the first rotary member includes an inner circumferential surface opposed to the torque transmission members from a radially outer side;
the second rotary member includes an outer circumferential surface opposed to the torque transmission members from a radially inner side;
the torque transmission members include a radially outermost torque transmission member disposed at an outermost position with respect to the radial direction; and
during transmission of torque between the first rotary member and the second rotary member, a middle portion of the radially outermost torque transmission member is pressed against the inner circumferential surface of the second rotary member in the radial direction, so that the torque is transmitted to the second rotary member also via the middle portion of the radially outermost torque transmission member.

12. The electric tool according to claim 11, wherein the first rotary member includes a receiving recess defining the inner circumferential surface and configured to receive the at least a part of the second rotary member and at least a part of each of the torque transmission members.

* * * * *